United States Patent [19]

Yamamoto et al.

[11] Patent Number: 5,515,482
[45] Date of Patent: May 7, 1996

[54] SORTING APPARATUS AND METHOD FOR SORTING DATA IN SEQUENCE OF REFERENCE LEVELS INDICATED BY THE DATA

[75] Inventors: Hitoshi Yamamoto, Amagasaki; Shigeru Miyake, Kobe, both of Japan

[73] Assignee: Ricoh Co., Ltd., Tokyo, Japan

[21] Appl. No.: 879,033

[22] Filed: May 6, 1992

[30] Foreign Application Priority Data

May 10, 1991 [JP] Japan ................... 3-135981

[51] Int. Cl.⁶ ........................................... G06F 17/00
[52] U.S. Cl. ........................................ 395/119; 395/122
[58] Field of Search ........................ 395/119, 162, 395/164, 122, 161

[56] References Cited

U.S. PATENT DOCUMENTS

| | | | |
|---|---|---|---|
| 4,970,499 | 11/1990 | Ryherd et al. | 395/122 |
| 5,043,921 | 8/1991 | Gonzalez-Lopez et al. | 395/122 |
| 5,167,018 | 11/1992 | Ueda | 395/162 |
| 5,251,290 | 10/1993 | Pabon | 395/119 X |
| 5,265,199 | 11/1993 | Catlin | 395/164 X |
| 5,268,995 | 12/1993 | Diefendorff et al. | 395/122 |
| 5,283,867 | 2/1994 | Bayley et al. | 395/162 X |
| 5,287,436 | 2/1994 | Fischer et al. | 395/164 X |

Primary Examiner—Heather R. Herndon
Assistant Examiner—Cliff N. Vo
Attorney, Agent, or Firm—Cooper & Dunham

[57] ABSTRACT

A sorting apparatus comprises a data memory for storing a plurality of data, each of the data comprising reference data indicating a predetermined reference level, a sorting memory for writing therein data based on the plurality of data and a control unit for sorting the plurality of data in sequence of the reference levels of the plurality of data. The control unit also writes data to the sorting memory so that addresses of the plurality of data are obtained in the sequence of the reference levels of the plurality of data by tracing data written in the sorting memory by repeated reading of data in the sorting memory by a unit in which each data has information about a respective address of a next data to be read.

5 Claims, 18 Drawing Sheets

FIG.3

| D11 | 10 | 9 | 8 | 7 | 6 | 5 | 4 | 3 | 2 | 1 | 0 |
|---|---|---|---|---|---|---|---|---|---|---|---|
| | X | X | X | X | X | X | X | X | X | X | X |

FIG.4

DATA MEMORY 3

| | | |
|---|---|---|
| 0H | Z AXIS VALUE | 4H |
| 1H | | FDH |
| 2H | | 1H |
| 3H | | 4H |
| 4H | | 1H |
| ⋮ | ⋮ | |
| 5FFH | | |

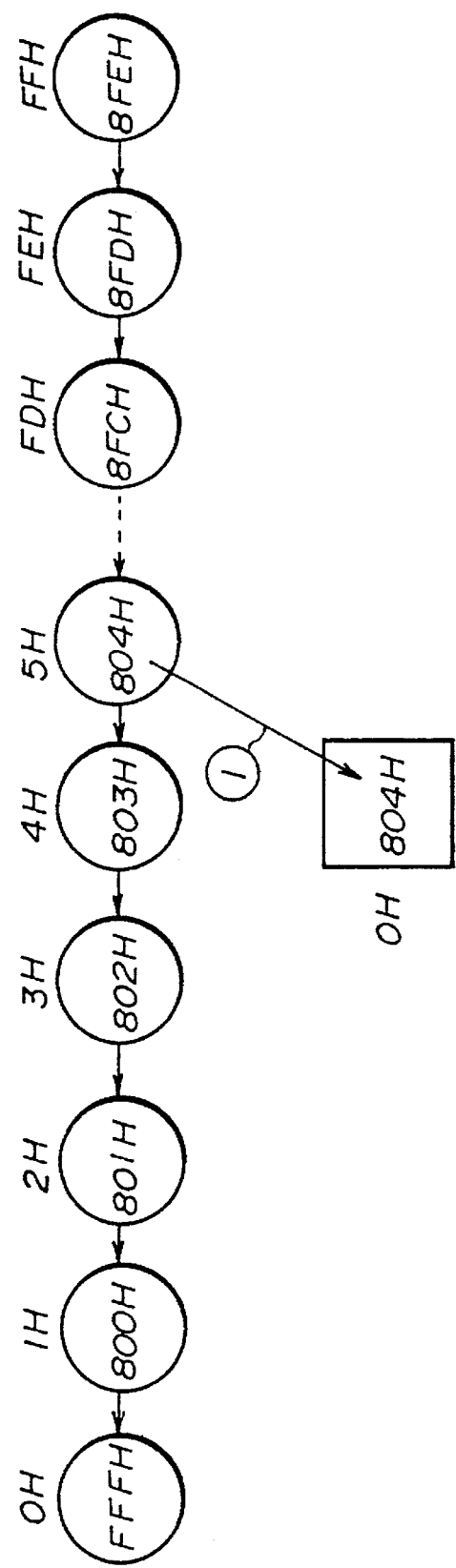

FIG.9

MEMORY 11

| | |
|---|---|
| OH | a |
| ⋮ | ⋮ |
| FBH | 10 |
| FCH | 0 |
| FDH | 5 |
| FEH | 2 |
| FFH | 8 |

FIG.10

MEMORY 11

| | |
|---|---|
| OH | X + a |
| IH | X |
| ⋮ | ⋮ |
| FBH | 24 |
| FCH | 14 |
| FDH | 14 |
| FEH | 9 |
| FFH | 7 |

FIG. IIA

DATA MEMORY 3

| 0H | Z LEVEL FEH |
|---|---|
| 1H | FDH |
| 2H | FFH |
| 3H | FEH |
| | --- |

FIG. IIB

MEMORY 11

| 0H | — |
| --- | --- |
| | ---- |
| FBH | 18H |
| FCH | EH |
| FDH | EH |
| FEH | 9H |
| FFH | 7H |

FIG. IIC

MEMORY 12

| 0H | — |
| --- | --- |
| | --- |
| 7H | — |
| 8H | — |
| 9H | — |
| | --- |
| EH | — |

FIG.12A

DATA MEMORY 3

| 0H | Z LEVEL FEH |
| 1H | FDH |
| 2H | FFH |
| 3H | FEH |
| | - - - - |

FIG.12B

MEMORY 11

| 0H | — |
| FBH | 18H |
| FCH | EH |
| FDH | DH |
| FEH | 7H |
| FFH | 6H |

FIG.12C

MEMORY 12

| 0H | — |
| 7H | 2H |
| 8H | 3H |
| 9H | 0H |
| EH | 1H |

[5,515,482]

SORTING APPARATUS AND METHOD FOR SORTING DATA IN SEQUENCE OF REFERENCE LEVELS INDICATED BY THE DATA

BACKGROUND OF THE INVENTION

This invention is related to, a sorting apparatus and a method for sorting data based on a plurality of reference axis data.

An image forming apparatus forms a variety of kinds of image signals based on image information supplied thereto from outside. The image forming apparatus then provides the image signals. This image forming apparatus can form and provide not only two-dimensional plane images but also three-dimensional stereoscopic images. The image forming apparatus is therefore utilized for such uses as, for example, a video game using stereoscopic images, operating simulators for airplanes and other kinds of vehicles, computer graphics, a display of a CAD (Computer Aided Designing) apparatus, etc.

If a stereoscopic image having depth is formed in real time by means of an image forming apparatus, each polygon or object needs to be sorted frame by frame, at high speed, based on information regarding a coordinate axis of image depth direction, that is, based on information regarding the Z axis.

FIG. 1 is a flowchart showing processes, which processes is related to the present invention regarding a stereoscopic image. For the purpose of realizing a stereoscopic image accurately, many polygons are needed to form the image, for example, ten thousand. Thus, if the processes shown in FIG. 1 are executed using a number of polygons to be processed double an original number, a geometric conversion step S1 and an image drawing step B3 respectively need double the original processing time. Further, an indicating step S4 needs the same time as when processing the original number of polygons. In contrast, a sorting step S2 needs more than double the time required when processing the original number of polygons. Further, the more the number of polygons to be processed is increased, the more the ratio of a processing time to total processing time increase. Thus a need for high-speed processing has been manifested.

In order to achieve a high-speed processing, a sorting apparatus for sorting a plurality of stereoscopic data based on a predetermined reference axis, that is, the Z axis, has to be further developed.

Conventional sorting is performed in such a manner that Z axis information included with each data is compared with each adjacent data, one by one. Each data is sorted based on the result of the above mentioned comparison after the comparison takes place. This operation is performed for all of the data.

In conventional technology, the following operation is needed in performing the above mentioned sorting operation. That is, data transfer between memories is repeated many times, the data transferred being all of the Z axis information. It is difficult therefore to perform this data sorting with high speed. In particular, increase of the number of Z axis data to be compared results in large increase in the time required for the sorting. Thus, a relatively large scale computer is needed to make this sorting operation be in high speed one. As a result, it has been a problem that the apparatus needed for the sorting becomes complicated and then costly.

SUMMARY OF THE INVENTION

The present invention has been made with regard to the above problem, the general object of the invention being to provide a sorting apparatus of simple composition and a method wherein a sorting process for a plurality of data can be performed with high speed.

In order to achieve this object of the present invention, a sorting apparatus according to the first present invention has been made, which apparatus comprises:

a data memory for storing a plurality of data, each of the data having reference data indicating a predetermined reference level;

a sorting memory for writing therein data based on the plurality of data;

control means for sorting the plurality of data in sequence of the reference levels of the plurality of data;

the control means writing data to the sorting memory so that addresses of the plurality of data are obtained in the sequence of the reference levels of the plurality of data by tracing data written in the sorting memory by means of repeatedly reading a next data indicated by the data written in the sorting memory.

The sorting apparatus according to the first present invention will be described in further detail below. The sorting memory comprises:

a first sorting memory wherein addresses are respectively set corresponding to the reference levels, and a second sorting memory for receiving data transmitted from the first sorting memory;

the control means comprising first control means for writing address data of the first sorting memory in respective storage areas of the first sorting memory so that each address data written in a respective storage area corresponds to one reference level, and each respective storage area is itself addressed as an address corresponding to another reference level one level behind of the one reference level, and second control means for reading data stored in the data memory in sequence after completion of an operation of the first control means, for reading data stored in a storage area of the first sorting memory each time the data is read from the data memory, the storage area being addressed with an address corresponding to one reference level, the one reference level being advanced one level another reference level, and the other reference level being indicated by a reference data included in the data read from the data memory, for writing the data read from the first sorting memory to each storage area of the second sorting memory in sequence every time the data is read from the first sorting memory, and for writing an address of the storage area to the storage area of the first sorting memory.

In the above sorting apparatus, first, data stored in the first and second sorting memories are traced in sequence. This tracing is performed by following an address designated by the data. Data are read from the data memory in accordance with traced data of the second sorting memory during the above mentioned tracing. The traced address of the second sorting memory designates an address of data of the data memory to be read. Then, the data can be read from the data memory in the sequence of reference levels of the data.

Further, a sorting apparatus according to the second present invention comprises:

a data memory for storing therein a plurality of data, each of the data having reference data indicating predetermined reference level;

a sorting memory for writing data therein based on the plurality of data;

control means for sorting the plurality of data in the sequence of the reference levels of the plurality of data;

the control means writing addresses of the plurality of data to the sorting memory corresponding to sequence of the plurality of data if the plurality of data are ordered in accordance with sequence of the reference levels of the plurality of data.

The sorting apparatus according to the second present invention will be described in further detail below. The sorting memory comprising a first sorting memory wherein addresses thereof are respectively set to correspond to the reference levels, and a second sorting memory for writing addresses of the plurality of data therein corresponding to sequence of the reference levels of the plurality of data;

the control means comprising first control means for reading the plurality of data in sequence, and for incrementing data written in a storage area addressed as an address corresponding to a reference level of the data read each time one of the plurality of data is read, second control means for reading data written in the first sorting memory in sequence after completion of an operation of the first control means, and for rewriting a result of decrementing by one, data first read from the first sorting memory in a storage area from which the one data is read in the first sorting memory, and for rewriting a result of adding together one read data and another data read after the one read data in a storage area from which the another data is read from the first sorting memory, and third control means for reading the plurality of data in sequence after completion of an operation of the second control means, for reading data in the first sorting memory addressed as each of the plurality of data each time one of the plurality of data is read, for writing an address number, from which address each of the plurality of data is read, in a storage area addressed as the data read from the first sorting memory, and for rewriting a result of decrementing by one the data read from the first sorting memory in the storage area thereof, from which storage area the data is read.

In the above sorting apparatus, first, data are read from the second sorting memory in sequence of the addresses of the second sorting memory. The data read from the second sorting memory indicate addresses of data stored in the data memory. Also, by reading data from the data memory in accordance with addresses designated by the data read from the second sorting memory, the data can be read in the sequence of reference levels of the data.

Further, in the above sorting apparatuses respectively according to the first and second present invention, such sorting of a plurality of data based on reference data thereof is performed by such a simple process as transferring data, etc. Therefore it is possible to provide a sorting apparatus which performs a sorting process at high speed.

Further, in the first present invention, if each of the reading and writing actions performed on the first or second sorting memory is defined as being one cycle, and if the possible number of levels indicated by reference axis data is M levels and a number of data to be sorted is N items, then M cycles are needed for the first control means, and 3N cycles are needed for the second control means. Thus, M+3N cycles are needed for completing the predetermined sorting operation. Further, 2M cycles are needed for the third control means, finally 3(M+N) cycles, which is the maximum, are needed to complete the sorting operation. That is, the number of cycles needed for the sorting operation is indicated by the linear expression 3(M+N). Thus, if the number N or M is enlarged, the number of cycles needed for the sorting operation increases linearly.

Further, since a period of time needed for transferring data from the data memory to the sorting memory corresponds to N cycles, which N, as mentioned above, is the number of data to be sorted as above, then the sorting operation can be performed in the minimum period of time.

Further, in the second present invention, if each of the reading and writing actions performed on the first or second sorting memory is defined as being one cycle, and if the possible number of levels indicated by reference axis data is M levels and a number of data to be sorted is N items, then M cycles are needed for the initialization of the first sorting memory, N cycles are needed for the second control means, and 3N cycles are needed for a third control means. Thus, 8N+M cycles are needed for completing the predetermined sorting operation. That is, the number of cycles needed for the sorting operation is indicated by the linear expression 8N+M. Thus, if the number N or M is enlarged, the number of cycles needed for the sorting operation increases linearly. Further, especially, in the linear expression, the number M is not multiplied, while the number N is multiplied by 8, then even if a possible number of the reference data levels, that is M, is increased, such an increase will hardly influence the total amount of time needed for performing the sorting operation.

Other objects and further features of the present invention will become more apparent from the following detailed description when read in conjunction with the accompanying drawings.

BRIEF DESCRIPTION OF THE DRAWINGS

FIG. 3 is a data composition diagram of sorting memoris;

FIG. 4 is a data table showing a condition of data stored in a data memory;

FIGS. 6A to 6G are diagrams showing link compositions of the first sorting memory and a second sorting memory after a second control operation has been performed on data stored in the memories, according to the first invention;

FIG. 9 is a data table showing a condition of data stored in a first sorting memory after the first control operation according to the second invention is performed on the data;

FIG. 10 is a data table showing a condition of data stored in the first sorting memory after the second control operation according to the second invention is performed on the data;

FIGS. 11A to 11C are data tables showing data conditions in a data memory, and the first sorting memory and a second sorting memory after the second control operation is performed on the data;

FIGS. 12A to 12C are data tables showing data conditions in the data memory, and the first and second sorting memories after the third control operation according to the second invention is performed on the data.

DESCRIPTION OF THE PREFERRED EMBODIMENT

Figure 1:
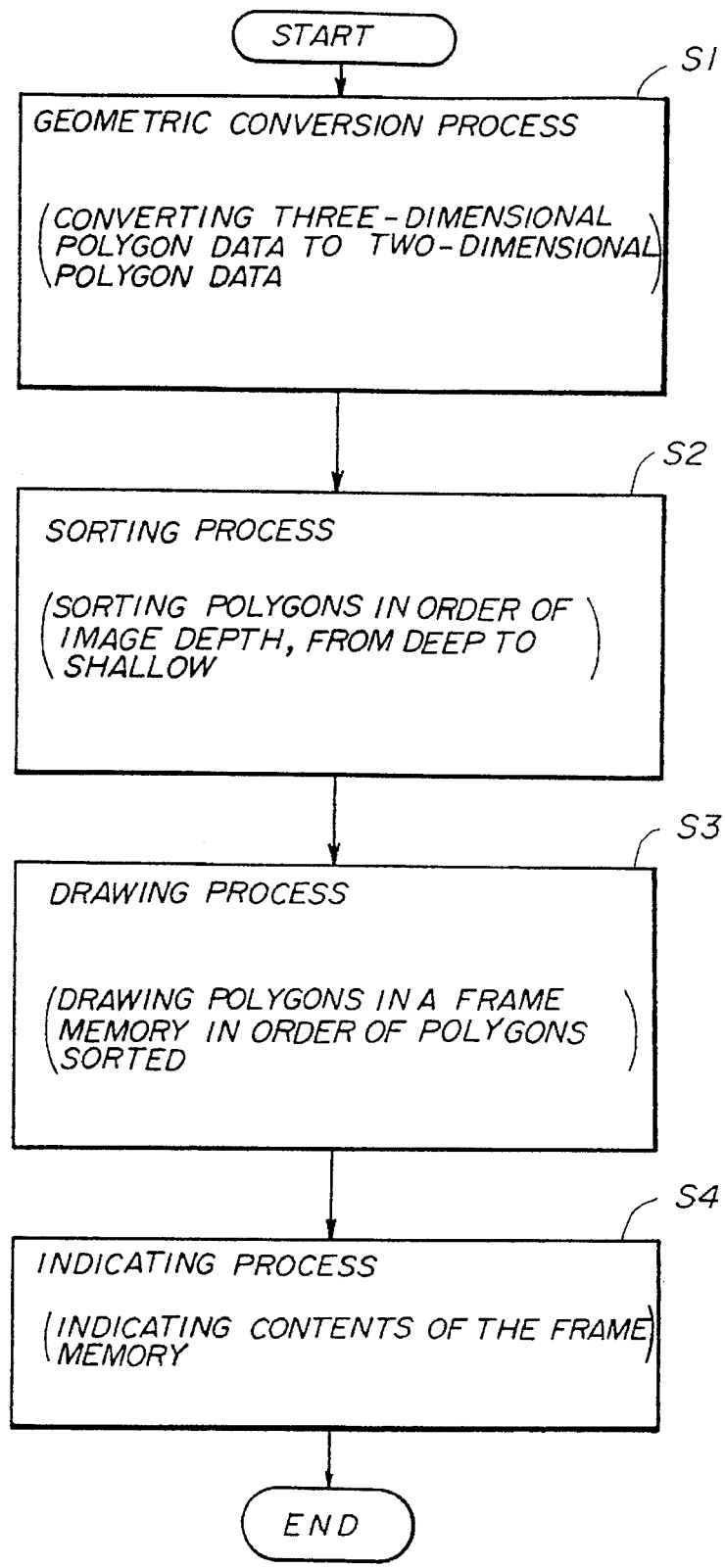
FIG. 1 is flowchart of a stereoscopic image processes.
Figure 2:
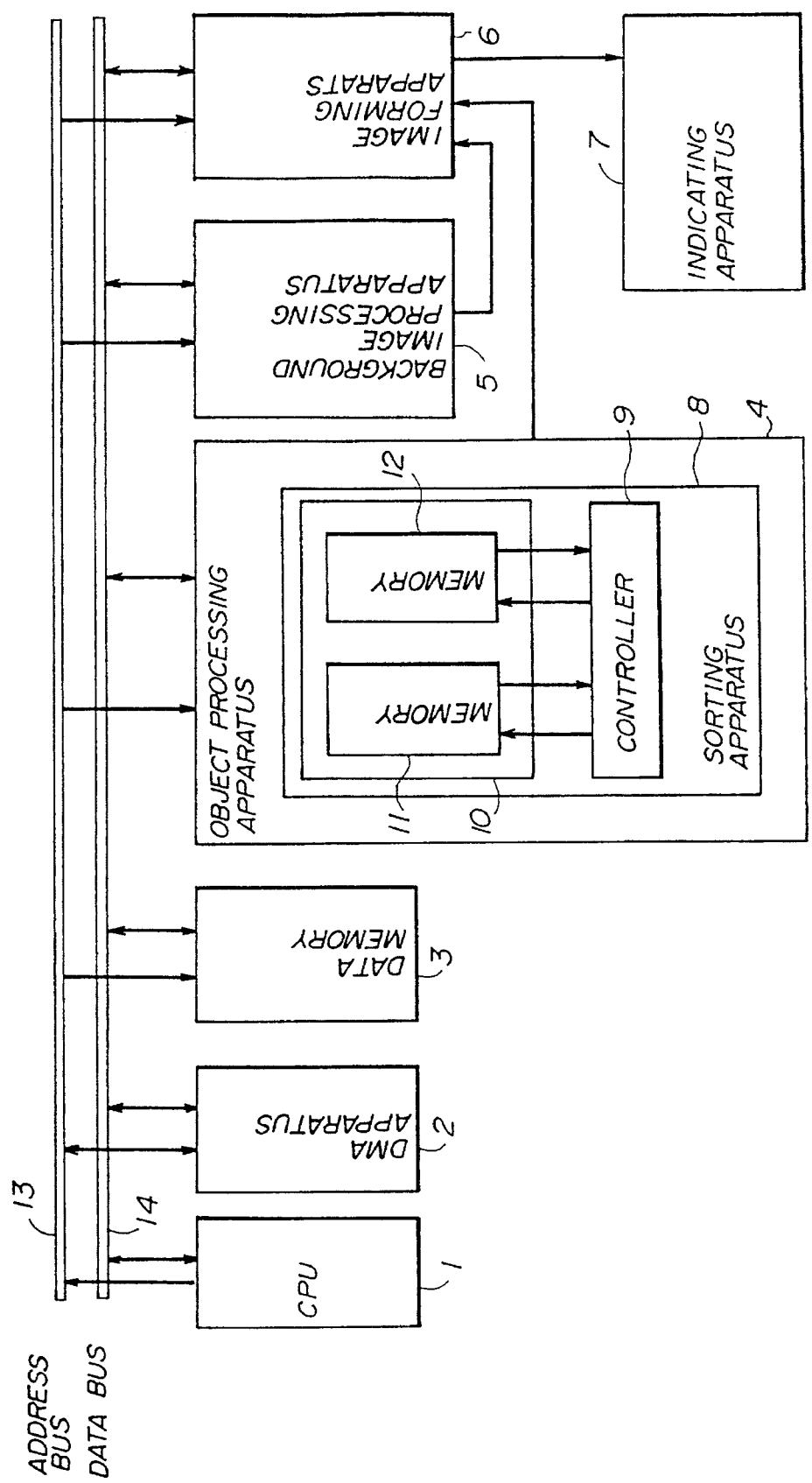
FIG. 2 is a block diagram showing an example of an image processing apparatus including a preferred embodiment of a sorting apparatus according to the present invention.

In FIG. 2, a CPU (Central Processing Unit) 1 controls an object processing apparatus 4, a background image processing apparatus 5 and an image forming apparatus 6. A direct memory access (DMA) apparatus 2 accesses a data memory 3 and then the DMA apparatus 2 transmits data stored in the data memory 3 to a sorting apparatus 8 by means of a data bus 14. The object processing apparatus 4 sorts object data based on Z axis data by means of the sorting apparatus 8, the sorting apparatus 8 being provided in the object processing apparatus 4 according to an embodiment of the present invention.

Further, the object processing apparatus 4 processes the object data so that a dot of one object is indicated on a screen, which one object has Z axis data, an amount of this data is, smaller than that of Z axis data of the other objects if a plurality of the objects overlap each other. Further, the object processing apparatus 4 transmits indicating data formed by the above mentioned process the image forming apparatus 6.

The image forming apparatus 6 processes the indicating data transmitted from the object processing apparatus 4 and the background image processing apparatus 5 so that a dot of one indicating data is indicated on the screen, which one indicating data has Z axis data smaller than that of the other indicating data if a plurality of the indicating data overlap each other. Further, the image forming apparatus 6 transmits the indicating data formed by means of the above mentioned processes.

An indicating apparatus 7 indicates the indicating data transmitted from the image forming apparatus 6 on the screen.

In the embodiment shown in FIG. 2, 1536 items of object data each including Z axis data, are desirably stored in the data memory 3. Further, predetermined addresses in the data memory 3 are accessed by the DMA apparatus 2 or the CPU 1 by means of an address bus 14. 1536 items of the object data are transmitted to the sorting apparatus 8 by means of the above accessing. The sorting apparatus 8 sorts data in accordance with sequence from larger data to smaller data. Further, Z axis data are numbers 0 to 255 in this embodiment.

The sorting apparatus 8 comprises a sorting memory 10 having at least two sorting memory areas. In this embodiment, a memory 11 comprising a random access memory is used for a first sorting memory. Further, a memory 12 also comprising a random access memory is used for a second sorting memory. The memory 11 has a storing capacity of 12 bits×256 words and the memory 12 has a storing capacity of 12 bits× 1536 words. Addresses of memory 11 or memory 12 are stored as data in both the memory 11 and the memory 12. Further, the contents of the memories 11, 12 are rewritten to predetermined address data in sequence by means of a controller 9 provided in the sorting apparatus 8 based on data transmitted from the data memory 3.

In the present invention, after completion of the sorting, by a method of tracing between data of memory 11 and data of memory 12, a next data being instructed by addresses of the memories 11, 12, sequence of addresses for 1536 items of object data of the data memory 3 are recognized by the addresses of the memory 12, so that the object data can be sorted in such sequence as from larger data to smaller data of Z axis data included in each of the object data by sorting the object data in accordance with this sequence of addresses. That is, a feature of the present invention is that data can be written to the memories 11, 12 by means of the controller 9.

Subsequently, controlling processes of this writing operation will be further described with reference to FIGS. 3 to 7.

Figure 3:
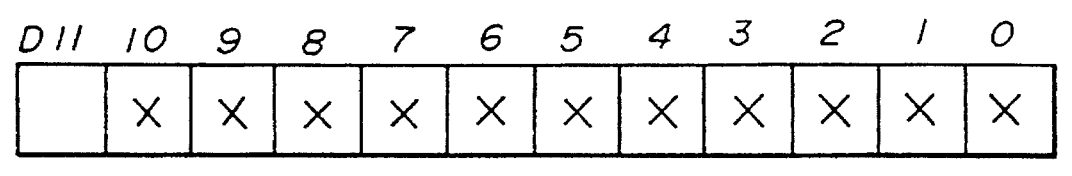

FIG. 3 shows a data composition in the memories 11 and 12. Each data in the memories 11, 12 comprises 12 bits, a bit D11 shown in FIG. 3 being used to recognize addresses of the memory 11 or 12. Data having a bit D11 of "0" comprised address data of the memory 12, while data having a bit D11 of "0" comprises address data and end data of the memory 11. In the embodiment, the address data of memory 12 are numbers 0H to 5FFH, while the address data of memory 11 are numbers 800H to 8FFH and the end data is number FFFH ("H" will hereinafter refer to a hexadecimal number). The reason why a first figure of each number of the address data of the memory 11 is "8" is that a first bit, that is, the bit D11 of the address data of memory 11, is "1".

Further, FIG. 4 shows one example of each data stored in the data memory 3.

Figure 5:
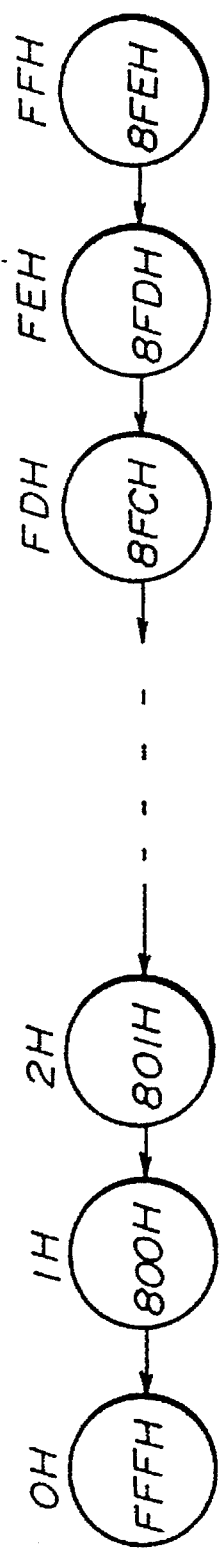
FIG. 5 is a diagram showing a condition of a first sorting memory after a first control operation has been performed on data stored in the memory, according to a first invention.

First, as shown in FIG. 5, a first control operation is executed by means of the controller 9. In FIG. 5, numbers inside of circles indicate data stored in storage areas, while numbers above the circles indicate addresses of respective storage areas.

In the first control operation, addresses of memory 11 regarded as being to be Z axis data, are set to be "0H" to "FFH", and stored in storage areas thereof so that each of the address numbers stored in the storage areas is smaller by one than an address number of a respective storage area, while end data "FFFH" is stored in a storage area of address "0H" of the memory 11. That is, as shown, for example, in the far right side of FIG. 5, a storage area of address "FFH" has data "8FEH" stored therein, the last three letters of the data "8FEH" indicate a number "FEH", the number "FEH" being smaller by one than the address number "FFH" of the storage area on the far right side of FIG. 5.

By means of the above first control operation, Z axis data from the largest data "FFH" to the smallest data "0H" are linked. Here and hereinafter, the condition "data are linked" means that such data are stored in a storage area designating an address of another storage area to be traced next, data stored in all storage areas being traced in sequence.

Subsequently, as shown in FIGS. 6A to 6G, a second control operation is executed by the controller 9. In the second control operation, the 1536 pieces of object data stored in the data memory 3 are linked based on Z axis data.

Before the above second control operation is executed, all storage areas of memory 12 are initialized as "0H".

The object data stored in the data memory 3 as shown in FIG. 4, each of which includes Z axis data, are transmitted to the sorting apparatus 8. That is, as the data memory 3 is being accessed by the CPU 1 or DMA apparatus 2, data stored in the data memory 3 are transmitted therefrom to the sorting apparatus 8 by means of the above accessing. Data stored in a storage area of the memory 11 is read and then the data is stored in the storage area of the memory 12 by means of the controller 9 of the sorting apparatus 8 each time the controller 9 receives data transmitted from the data memory 3. An address number of the above storage area of the memory 11 is that number obtained when one is added to a value of Z axis data included in the data transmitted from the data memory 3. An address of the above storage area of the memory 12 is the present address thereof.

Thus, the present address number of memory 12 is stored in the above storage area of the memory 11. Then, a present address of the memory 12 is incremented by one. The above process is carried out for each of the 1536 items of object data stored in the data memory 3, or carried out until Z axis data of data transmitted from the data memory 3 becomes "FFH" (end data). This operation will now be described with reference to FIGS. 4 to 6G.

First, data stored in a storage area having a first address "0H" of the data memory 3 is transmitted therefrom and then the data is received by the controller 9. Then, Z axis data of the above data is "4H", as shown in the uppermost portion of FIG. 4. Data "804H" stored in a storage area having an address "5H" of the memory 11 is read and then the data "804H" is stored in a storage area having an address "0H" of the memory 12 (FIG. 6A①). The above address number "5H" is obtained when one is added to the above data "4H" transmitted from the data memory 3. The above address "0H" is a first address of the memory 12.

Figure 6B:
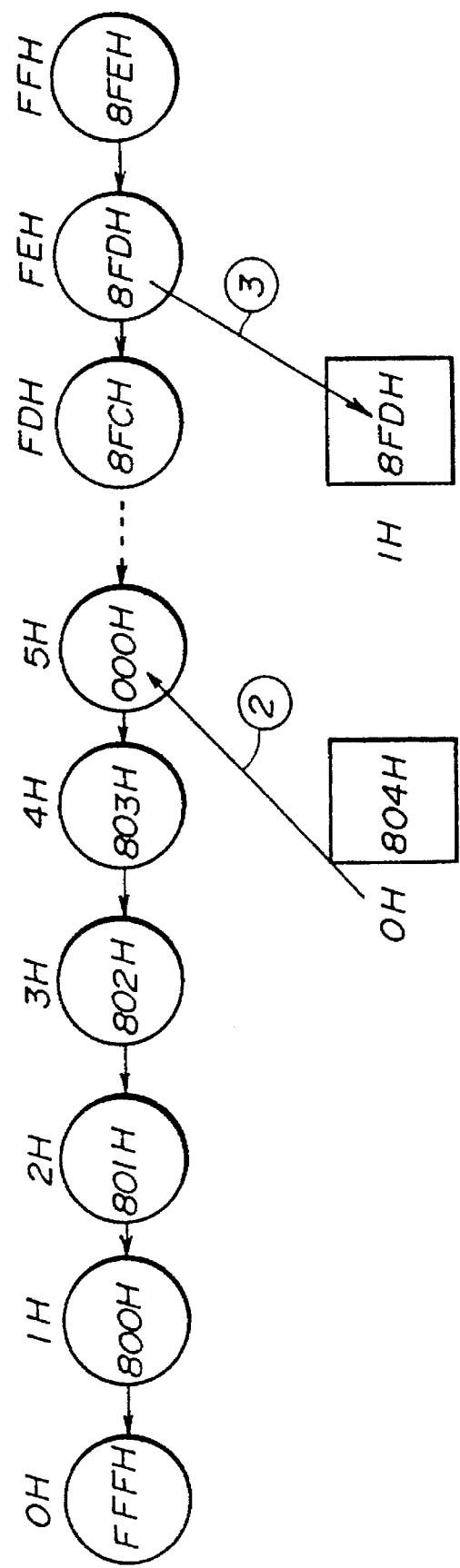

Further, address number "000H", that is, an address number substantially the same as the above address "0H" of the memory 12, is stored in the above storage area having the address "5H" of the memory 11 (FIG. 6B②).

Subsequently, the data stored in the storage areas addressed as "1H" to "4H" are read.

Figure 6C:
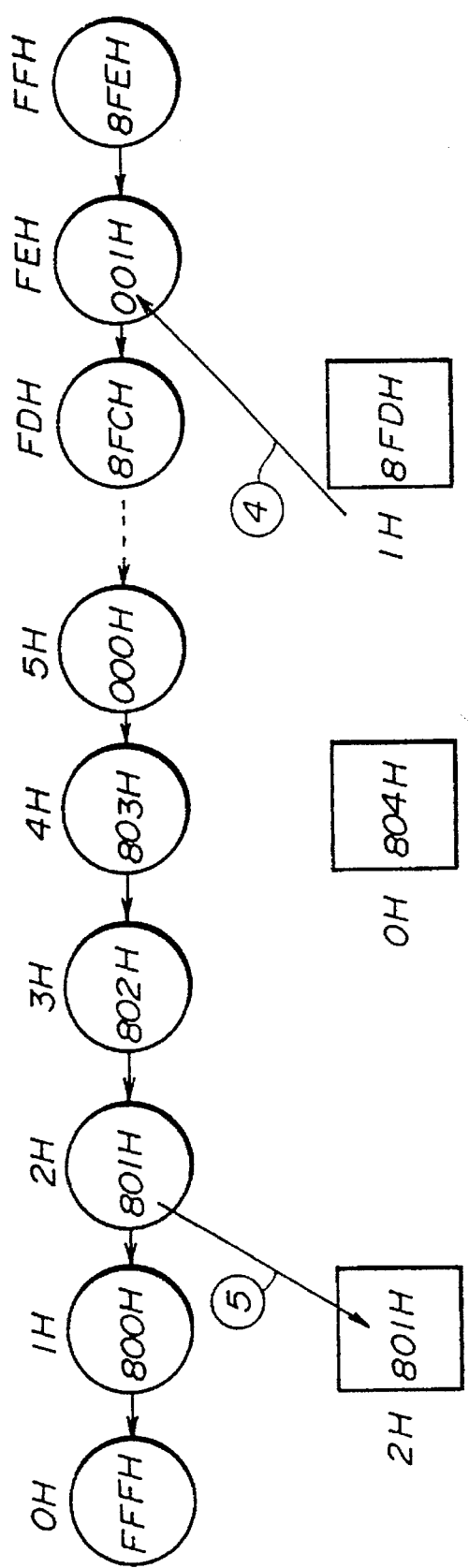

The above address "0H" of the memory 12 is incremented by one to "1H". Z axis data "FDH" of a data stored in the next storage area addressed as "1H" of the data memory 3 is read and the data "FDH" is transmitted therefrom. Data "8FDH" stored in a storage area addressed as "FEH", this data "FEH" being obtained when one is added to the above data "FDH", is written in a storage area addressed as the above "1H" of the memory 12 (FIG. 6B③). A number "001H", that is substantially the same as the above address number "1H" of the memory 12, is written in the above storage area addressed as "FEH" (FIG. 6C④).

Figure 6D:
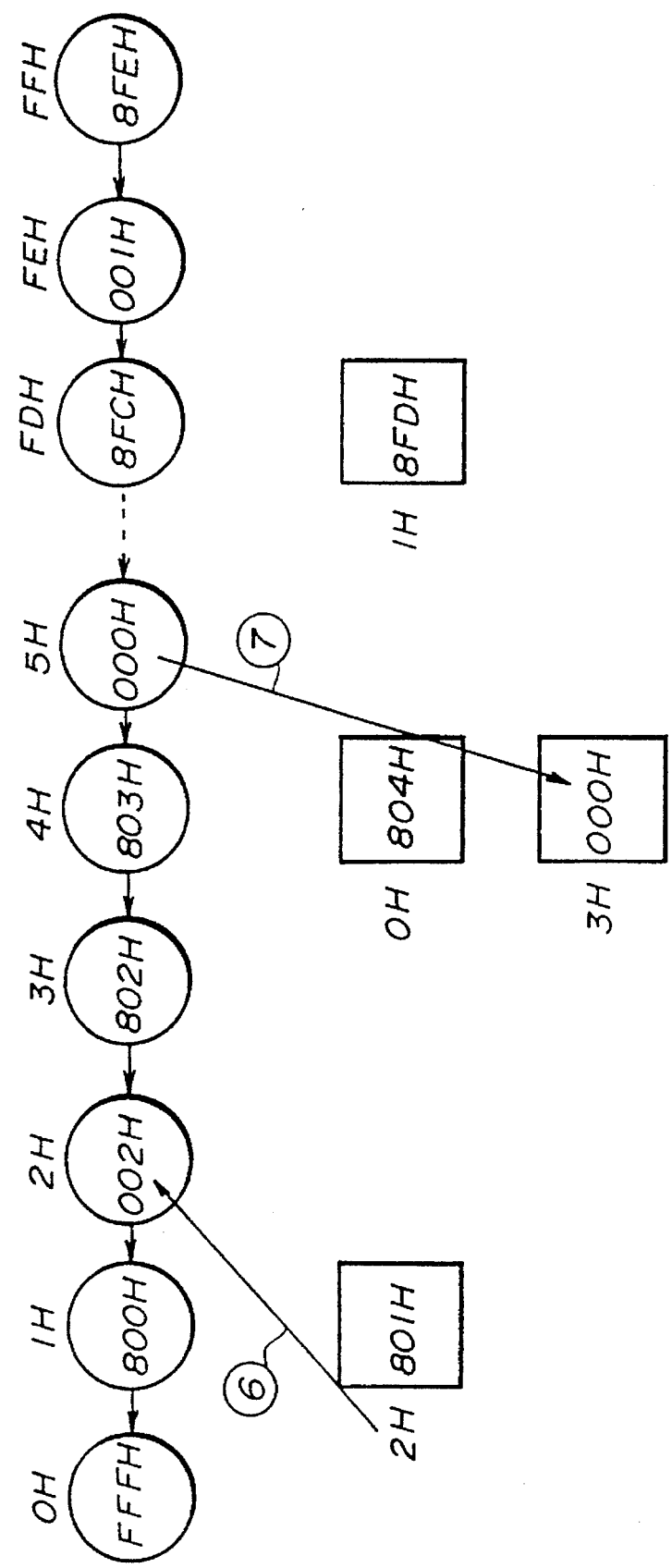

Similarly, the above address "1H" of the memory 12 is incremented by one to "2H". Z axis data "1H" of a data of address "2H" is transmitted from the data memory 3. Data "801H" of address "2H" (obtained when one is added to the above "1H") of the memory 11 is written in a storage area addressed as the above "2H" of the memory 12 (FIG. 6C⑤)). The above address "2H" ("002H") of the memory 12 is written in the above storage area addressed as "2H" (FIG. 6D⑥).

Figure 6E:
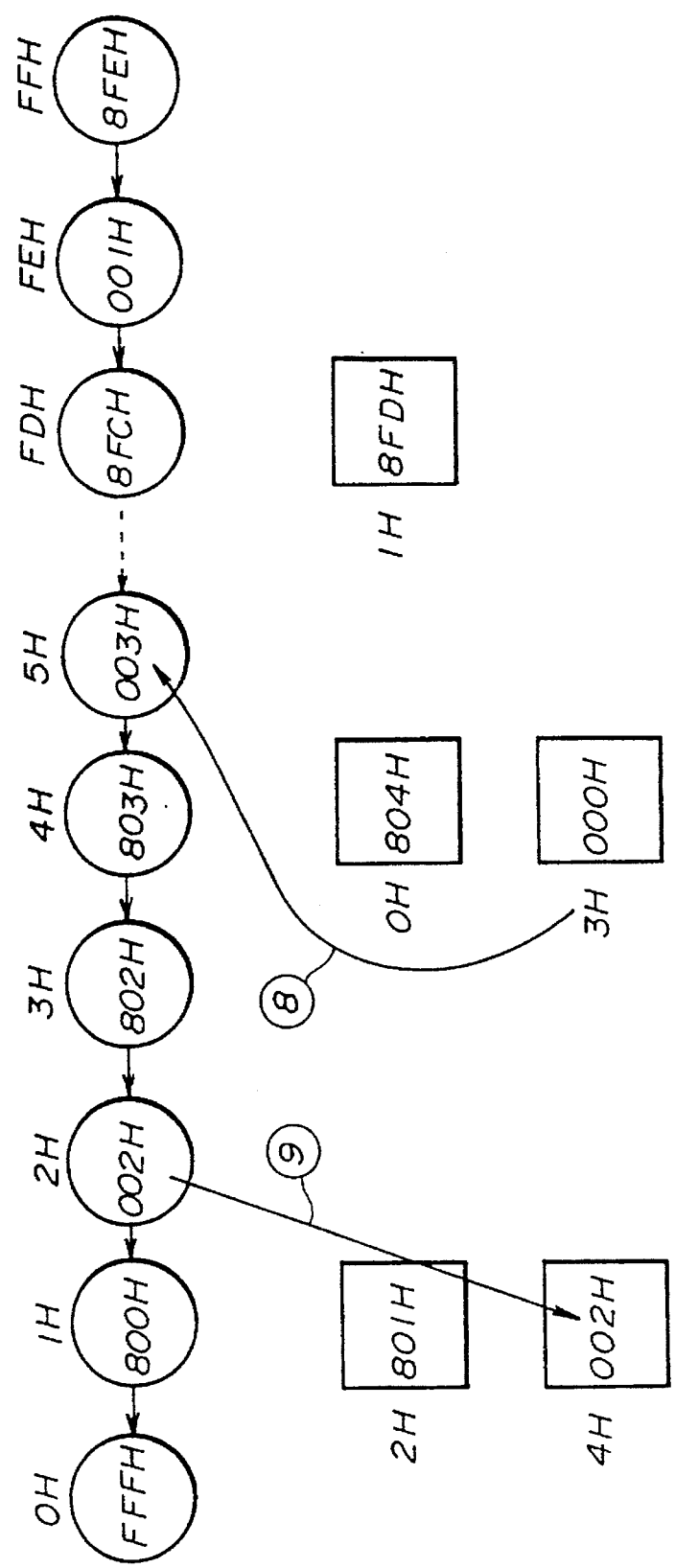

Similarly, the above address "2H" of the memory 12 is incremented by one to "3H". Z axis data "4H" of a data of address "3H" is transmitted from the data memory 3. Data "000H" of address "5H" (obtained when one is added to the above "4H") of the memory 11 is written in a storage area addressed as the above "3H" of the memory 12 (FIG. 6D⑦). The above address "3H" ("003H") of the memory 12 is written in the above storage area addressed as "5H" (FIG. 6E ⑧).

Figure 6F:
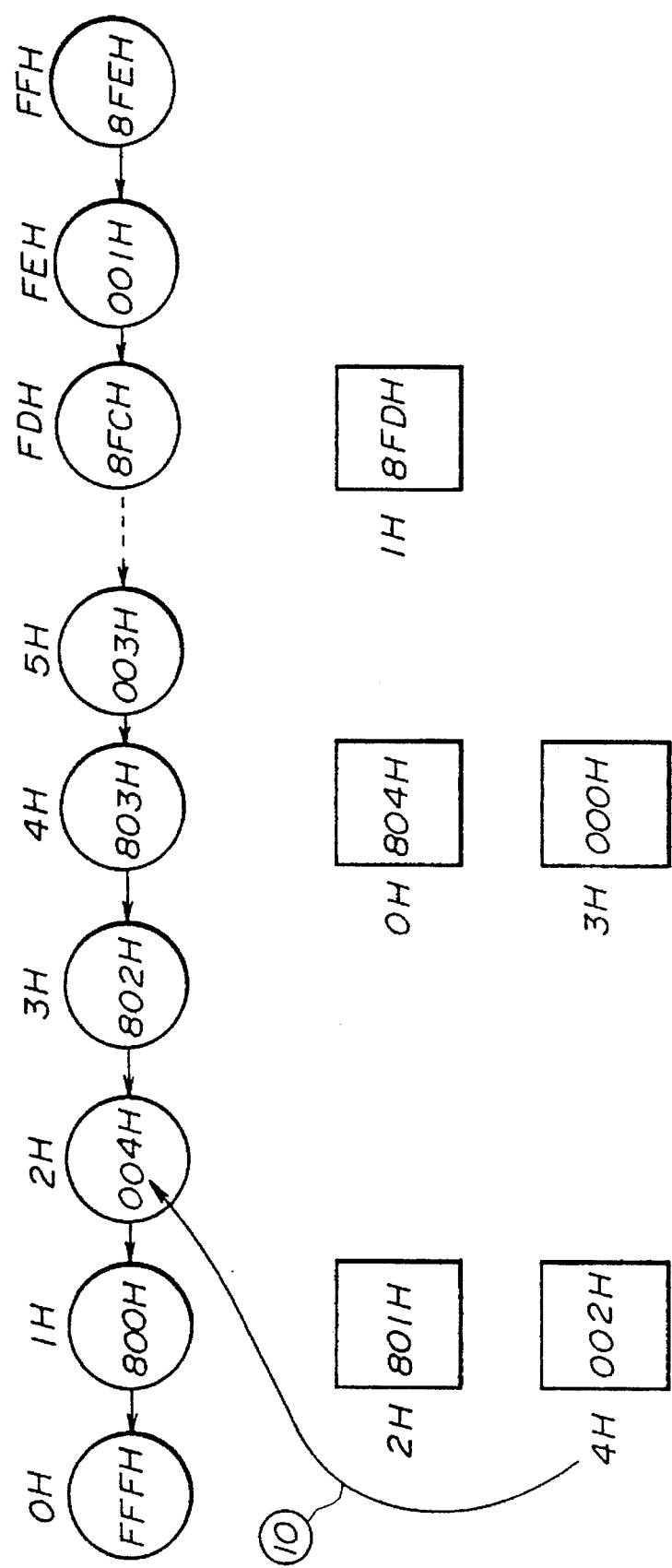

Similarly, the above address "3H" of the memory 12 is incremented by one to "4H". Z axis data "1H" of a data of address "4H" is transmitted from the data memory 3. Data "002H" of address "2H" (obtained when one is added to the above "1H") of the memory 11 is written in a storage area addressed as the above "4H" of the memory 12 (FIG. 6E⑨). The above address "4H" ("004H") of the memory 12 is written in the above storage area addressed as "2H" (FIG. 6F⑩).

Figure 6G:
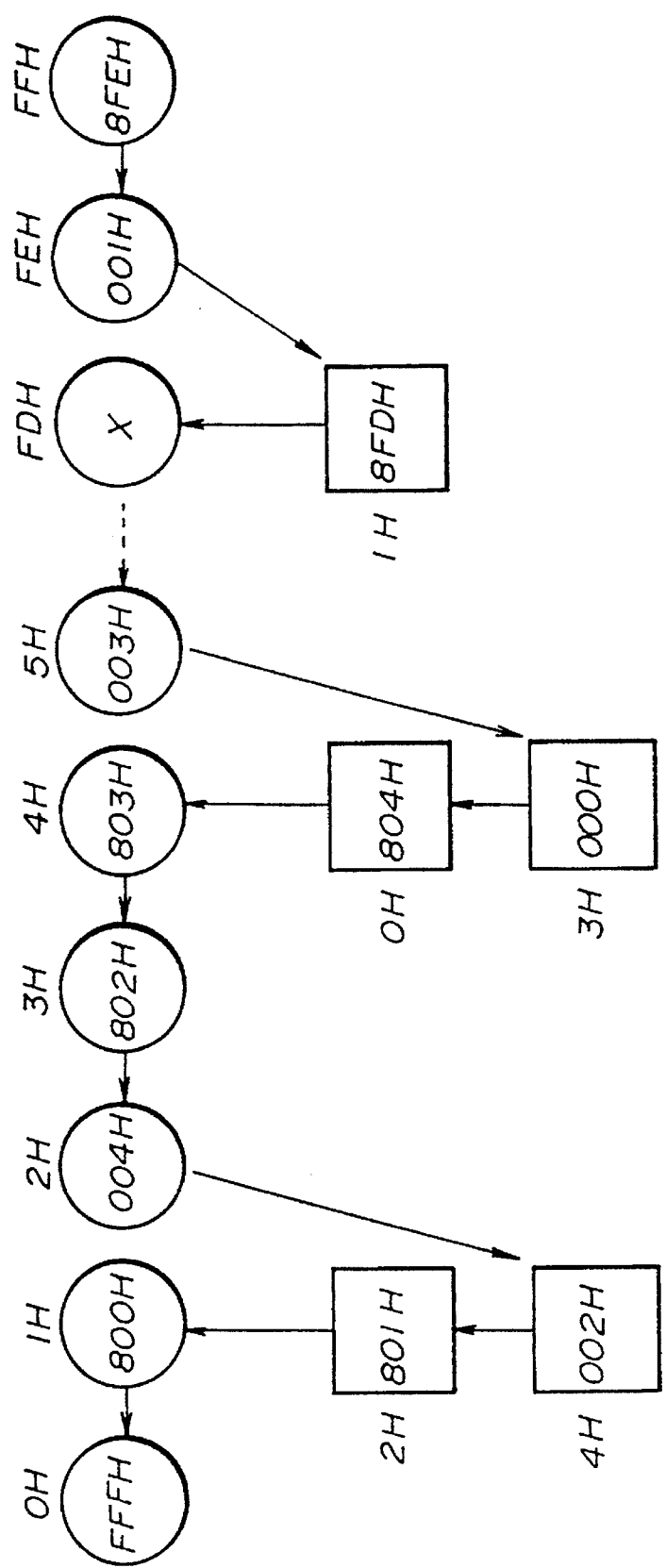

By means of the above operation, the object data stored in the data memory 3 are linked based on the Z axis data included in each of the object data as shown in FIG. 6G. The operation is performed for each of the 1536 items of the object data, or performed until the end data of Z axis data included in object data is read. By this process, the 1536 items of the object data are linked based on the Z axis data of the object data.

The condition after the completion of the above process is shown in FIG. 6G. Data written in the memory 11 are traced in accordance with the link from data of the memory 11 addressed as "FFH", that is "FEH". Here, "tracing data in accordance with the link" means tracing data in sequence by means of tracing next data addressed as the present data in sequence. For example, if the present data of is the first data, that is "8FFH" addressed as "FFH", the next data to be traced is data "001" addressed as "FEH", this address "FEH" being designated by the above first data "8FEH" (the first figure "8" of the data means that this address is for the memory 11, as mentioned above, and the last three figures "FEH" thereof designate the address of the next data to be traced.).

In the above way of tracing data of the memory 11 in accordance with the link, if an address designating a next data to be traced is an address of the memory 12, that is, a first figure of the address number is not "8", from this time onward data stored in the memory 12 will be traced. Also in the above way of the tracing data of the memory 11 in accordance with the link, if an address designating a next data to be traced is an address of the memory 11, that is, a first figure of the address number is "8", from this time onward data stored in the memory 11 will be traced until a data traced is an address number of the memory 12.

When the sequence of addresses of data stored in the memory 12 is traced, in the same above mentioned way that the data are traced, this sequence becomes the sequence of addresses of object data stored in the data memory 3 if the object data stored in the data memory 3 are ordered in accordance with sequence of Z axis data values from larger to smaller ones, which Z axis data are respectively included in the object data. Thus, by means of the above tracing, sequence of the object data stored in the data memory 3 can be sorted in accordance with the sequence of the Z axis data values due to the sequence of the address numbers traced in accordance with the link as in the above mentioned manner.

However, in the above way of the above tracing, during the repeating process of designating address data which designates the memory 11, for example, during the time that the data addressed as "4H" and "3H" is traced, it is necessary to trace the link of the memory 11. It is necessary that the amount of time required for carrying out the second control operation as short as possible. The period to be shortened being that needed for the tracing data stored in the memory 11.

Thus, in another embodiment according to the first present invention, a third control operation is performed regarding data stored in the memory 11. In the third control operation, data from "800H" through "8FFH" in the memory 11 is replaced with data from "0H" to "5FFH", which data from "0H" to "5FFH" designates addresses of data stored in the memory 12.

Figure 7:
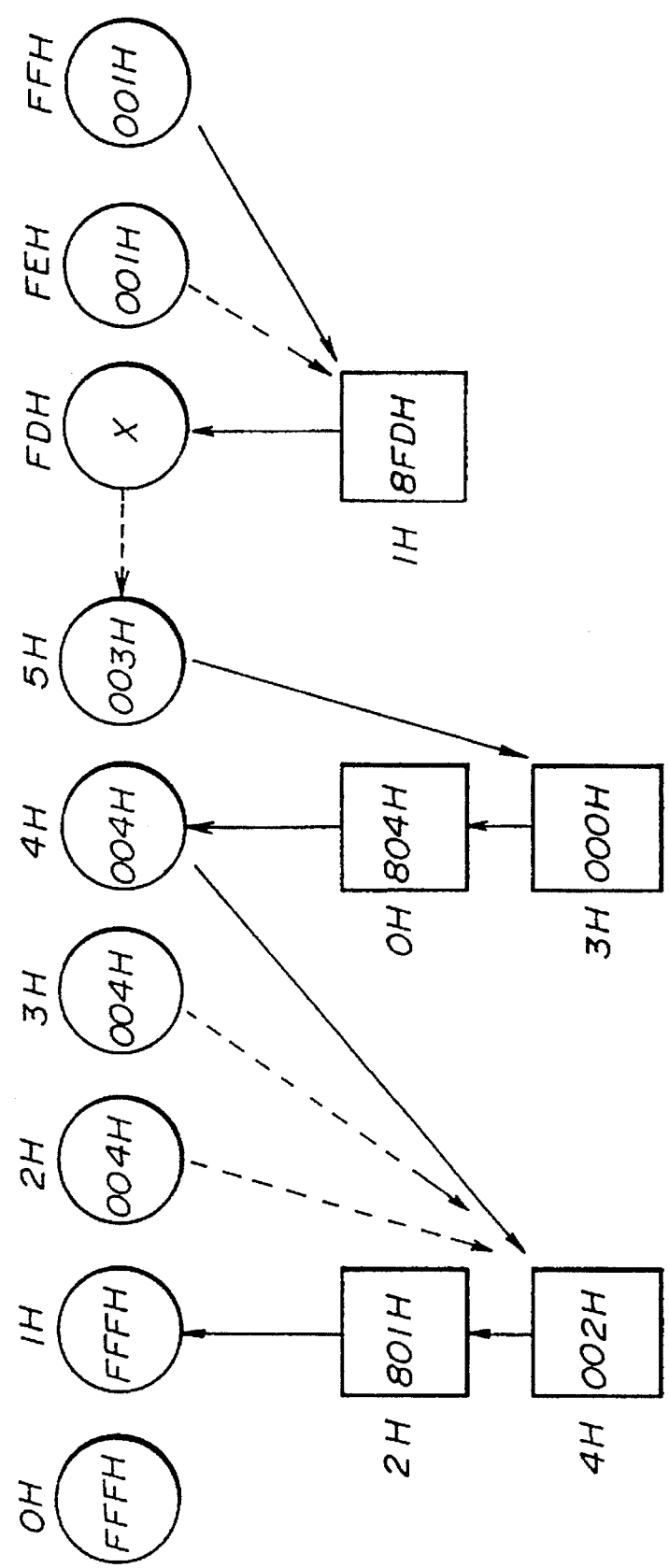
FIG. 7 is a diagram showing a link compositions of the first sorting memory and a second sorting memory after a third control operation has been performed on data stored in the memories, according to the first invention.

In the third control operation, in which data addressed from "0H" to "FFH" in the memory 11 is read in sequence, if the data read has a first value from "0H" to "5FFH", that is, the data designates an address number of memory 12, or the data read has a value of "FFFH" (end data), the data is registered in a data replacement register provided in the controller 9. Further, if the data read has a second value from "800H" to "8FFH", that is, the data designates an address number of memory 11, a value of data registered in the data replacement register is written in the storage area of the memory 11, the data already stored in this storage area before the above value is written therein having been read at the present time. A data condition after this operation is performed on the data condition shown in FIG. 6G is shown in FIG. 7.

A detailed explanation of the above operation performed on the data condition shown in FIG. 6G will be given below. Data addressed as "0H" has a value of "FFFH". Thus, this value is the same as that of the first value, from "0H" to "5FFH" or "FFFH". The data "FFFH" is registered in the data replacement register.

Subsequently, next data having a value "800H" addressed as "1H" in the memory 11 is read. This value is the same as that of the second value, that is the value from "0H" to "5FFH". Then, the value registered present time, that is "FFFH", is written as the data addressed as "1H".

Then, data "004H" addressed as "2H" in the memory 11 is read. This value "004H" being the same as that of the first value, the data "004H" is registered in the data replacement register. Next data addressed as "3H" having a value "802H" is read, which value is the same as that of the second value, the value "004H" which has been registered in the data replacement register is written in the storage area addressed as "3H" of the memory 11.

Thus, until the first value is read from the memory 11, the data read in the memory 11 are replaced by the value "004H" in sequence. By means of repeating such an operation, data stored in the memory 11, which data has values designating addresses of the memory 11, are replaced by values from "0H" to 5FFH".

Then, data are traced, starting from an address designated by the data addressed as "FFH" in the memory 11 according to the link in sequence. In this method of tracing data in the memory 12, if an address designating data of the memory 11 is read, because all data of the memory 11 have address numbers designating addresses of the memory 12 after the above third control operation, the link is returned to data of the memory 12 by tracing data in accordance with an address number designating an address of the memory 12. For example, as shown in FIG. 7, data "804H" addressed as "0H" of the memory 12 is read, then the next data "004H" addressed as "4H" (designated as the data "804H") is read. Then the link is returned at once from the data "004H" to data "002H" of the memory 12 because the data "004H" designates an address "4H" of the memory 12. On the other hand, in the condition shown in FIG. 6G, data in the memory 11 addressed as "3H" and "2H" should be read before the link is returned to the memory 12 in the condition shown in FIG. 6G.

After the link is returned to the memory 12, data of the memory 12 are traced until data designating an address of the memory 11 is read again. As a result, the time is takes to complete the operation of tracing the link in the memory 11 is shortened to the minimum.

Figure 8:
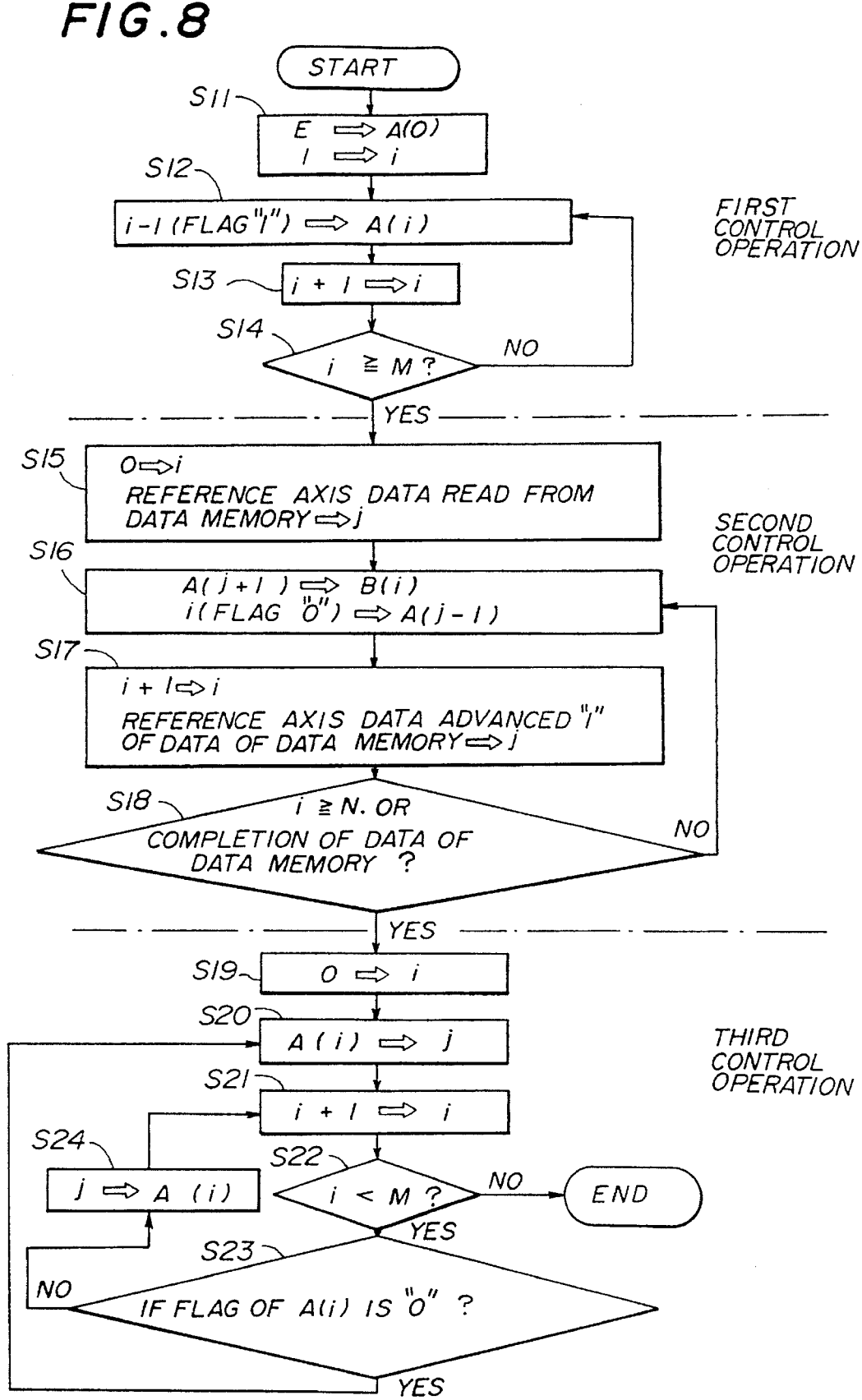
FIG. 8 is a flowchart of an embodiment according to the first invention.

FIG. 8 is a flowchart showing an operation of an embodiment according to the first present invention.

The meanings of the symbols in FIG. 8 are indicated below:

| | |
|---|---|
| M: | possible levels indicated by basic axis data. |
| 0, 1, 2, . . . , M-1: | addresses of the first sorting memory. |
| A(0), A(1), . . . , A(M-1) (data each having 1 bit of a flag): | data stored in the first sorting memory. |
| 0, 1, 2, . . . , N-1: | addresses of the second sorting memory. |
| B(0), B(1), . . . , B(N-1) (data each having 1 bit of a flag): | data stored in the second sorting memory. |

The operation of this embodiment will now be described.

First, in a step S11 (the word "step" will be omitted hereinafter) of the first control operation, an end data "E" is written in A(0) of the first sorting memory. Next, an address is set at "1". Then, in S12, a flag (a bit for an recognizing an address; flag will have the same meaning hereinafter) is set at "1", and a value, which is a result of subtracting "1" from a present address i, is written in A(i).

Next, in S13, the address i is incremented by "1". Then, S12 and S13 are repeated until the address i reaches M in S14. By this operation, the first control operation is completed.

Subsequently, in S15 of the second control operation, the address i is set at "0", and then reference axis data included in data stored in the data memory 3 is read. Here, the reference axis data read is referred to as j. Next, in S16, a data addressed as j+1 in the first sorting memory is written in a storage area which storage area is addressed as i in the second sorting memory. Then the flag being is set at "0", and then address i is written in a storage area which is addressed as j+1 in the first sorting memory.

Next, in S17, the address i is incremented by "1", and then a reference axis data of a next data stored in the data memory 3 is read. The reference axis data read is referred to as j. Then S16 and S17 are repeated until the address i reaches N or until all data stored in the data memory 3 have been read.

Next, in S19 of the third control operation, the address i is set at "0". Then, in S20, data A(i) of the first sorting memory is referred to as j (that is, A(i) is registered in the data replacement register). Then, the address i is incremented by "1" in S21, and next B23 is carried out unless i reaches M. In S23, the above S20 is carried out if the flag included in data addressed as i of the first sorting memory is "0", while S24 is carried out if the flag included in data addressed as i of the first sorting memory is "0". In S24, data j is written in a storage area which is addressed as i of the first sorting memory. Then the above S21 is carried out.

In the first present invention, if each of the reading and writing actions performed on the first or second sorting memory 11, 12 is defined as being one cycle, and if possible levels indicated by reference axis data (in this case, the Z axis data levels of 256 levels) are M levels and a number of data to be sorted (in this case, 1536 items)is N items, then M cycles are needed for the first control operation, 3N cycles are needed for the second control operation, and 2M cycles being needed for the third control operation, so that maximum 3(M+N) cycles are needed to complete the sorting. That is, the number of cycles needed for completing the sorting operation are indicated by the linear expression 3(M+N). Thus, if the number N or M is increased, the number of cycles needed for completing the sorting operation is increased linearly.

Further, as the time needed for transferring from the data memory 3 to the sorting apparatus 8 is a time corresponding to N cycles, which N is the number of data to be sorted as described above, the sorting operation can be completed in a minimum amount of time.

The second present invention will now be described below.

The circuit construction according to the second present invention is basically the same as that according to the first present invention, while, on the other hand, their respective methods for sorting data in the memories 11, 12 are different from each other. That is, the above method manner performed by the controller 9 according to the first invention is different from that performed by the controller 9 according to the second invention. The following description of the second invention will thus focus on the method for storing data in the memoried 11, 12 performed by the controller 9.

In the second present invention, 1536 items of object data each including Z axis data are stored in the data memory 3 in a manner that has no relation to the Z axis data level sequence. Further, predetermined addresses of the data memory 3 are accessed by means of the DMA apparatus 2 or the CPU 1, then the 1536 items of the object data are transmitted to the sorting apparatus 8 by means of the data bus 13. This sorting apparatus 8 sorts data in accordance with sequence from the largest to the smallest of the Z axis data values.

Further, possible levels indicated by the Z axis data are from 0 to 255. Addresses of the first sorting memory 11 are regarded as the levels the Z axis data, while a number indicated by data addressed as the above addresses indicate sequence numbers in which numbers data having Z axis data corresponding to the above addresses will be sorted in the 1536 pieces of object data based on the sequence of the Z axis data values.

Further, addresses of the second sorting memory 12 are from "0H" to "5FFH", and addresses designating the object data stored in the data memory 3 are stored in storage areas of the second sorting memory 12 in accordance with sequence from the largest to the smallest of the Z axis data values.

In the invention, first all data in the memory 11 is initialized as "0". Next, it is determined how many object data exist on each of the levels of the Z axis data. After this, by using the data written in the memory 11 as a result of the above determination, a starting address in the memory 12 for each of the levels of the Z axis data is calculated. Then by using the data stored in the memory 11, addresses of the object data in the data memory 3 are stored in storage areas of the memory 12. Then the sorting is completed.

The above operation of the second present invention will be described in more detail below. This description will focus on a process of writing data in the memoried 11, 12, with reference to FIGS. 9 to 12C.

First, all data of the memory 11 is initialized as "0" by means of the controller 9.

Subsequently, the first control operation is carried out by means of the controller 9.

The data memory 3 is then accessed by the CPU 1 or DMA apparatus 2, then object data each including Z axis data are transmitted from the data memory 3 to the sorting apparatus 8. A data addressed as an address corresponding to a Z axis data level is incremented by one by means of the controller 9 provided in the sorting apparatus 8, each time one object data is received by the sorting apparatus 8.

For example, in FIG. 4, if Z axis data of data addressed as "0H" in the data memory 3 is "4H", then data addressed as "4H" of the memory 11 is incremented by one from "0" to "1".

Then, the above operation is performed on each of the 1536 items of object data in the data memory 3. As a result, as shown in FIG. 9, data written in the memory 11 indicate how many object data exist on each of the Z axis data levels.

Subsequently, as shown in FIG. 10, the second control operation is carried out by means of the controller 9. First, data addressed as "FFH" is read, and then data in the memory 11 are read in accordance with sequence from the largest to the smallest of the address numbers. When this data addressed as "FFH" is read, a result of subtracting "1" from this data is rewritten in the storage area addressed as "FFH". Then, each time each of remaining data from data addressed as "FEH" are read, one data and another data addressed as an address number larger by "1" than an address number of the one data are read. Then these two data are added, the result of this addition being rewritten in the address of the one data.

The above operation is performed in sequence until a data addressed as "0H" in the memory 11 is read. For example, in FIG. 9, when a data "8" addressed as "FFH" in the memory 11 is read, a result "7" of subtracting "1" from this data "8" is rewritten in the storage area addressed as this address "FFH". Subsequently, data "2" addressed as "FEH" and data "7" addressed as an address "FFH", which address is larger by "1" than the address "FEH", are read. Then a result "9" of adding 2+7 is rewritten in the storage area addressed as "FEH".

By the above operation, data written in the memory 11 is made to respectively indicate starting addresses, by which starting addresses the writing of data in storage areas are started, the storage areas being addressed as the starting addresses. The result of this operation the condition of the data shown in FIG. 9 is shown in FIG. 10.

For example, in FIG. 10, writing is started from a storage area addressed as a starting address "9" with regard to data "FEH" of a Z axis data level, while writing is started from a storage area addressed as a starting address "7" with regard to data "FFH" of a Z axis data level.

Then, the data memory 3 is accessed by CPU 1 or DMA apparatus 2, and then object data each including Z axis data are transmitted to the sorting apparatus 8. Data addressed as a value of a Z axis data level included in a received object data is read from the memory 11 by the controller 9, each time the data is received. Then, the address number, which address corresponds to the object data, this data being transmitted from the data memory 3 at the present time, is written in a storage area in the memory 12, this storage area being addressed as the data, which data is read from the memory 11 at the present time. Subsequently, the data, which data is addressed as the Z axis data at present time, is decremented by "1", then a result of this decrementation is rewritten in the same storage area as that in which the data decremented at the present time before the above decrementation is stored. The above operation is performed for each of the 1536 items of object data. FIGS. 12A to 12C indicate the result of this operation on the condition of the data shown in FIG. 11A to 11C respectively, for data addressed as addresses from "0H" to "3H" in the data memory 3. Further, each of the FIGS. 11A, 12A indicates the data memory 3, each of the FIGS. 11B, 12B indicates the memory 11, and each of the FIG. 11C, 12C indicates the memory 12.

Concretely speaking, first, Z data level value "FEH" addressed as "0H" is read from the data memory 3 in the FIG. 11A, then data "9H" addressed as this "FEH" is read from the memory 11, then the above address "0H" of the data memory 3 is rewritten in the storage area addressed as this "9H" of the memory 12 in FIG. 11C, as shown in FIG. 12C.

Subsequently, the data "9H" of the memory 11 is decremented by "1" to "8H", then the data "8H" is rewritten in the storage area addressed as the "FEH" of the memory 11. Because a Z axis data level of data addressed as "3H" in the data memory 3 is also "FEH", with regard to the data addressed as "FEH", when this data addressed as "3H" is transmitted from the data memory 3, the data addressed as the "FEH" of the memory 11 is decremented by "1" again to "7H" as shown in FIG. 12B, in the same manner as that of the data addressed as "0H" being transmitted from the data memory 3.

As a result of the above operation being carried out, if data addressed as addresses from "0H" to "5FFH" in the memory 12 are read in sequence, sequence of the data read corresponds to sequence of addresses of the data memory 3 if data of the data memory 3 are ordered according to sequence of Z axis data level values from the largest to the smallest thereof.

Concretely speaking, the sequence of data of memory 12 shown in FIG. 12C, "2H", "3H", "0H" and "1H" is the sequence of addresses of the data memory 3 shown in FIG. 12A if the data of the data memory 3 are ordered according to sequence of Z axis data level values from the largest to the smallest thereof. That is, among data shown in FIG. 12A, if the data are ordered according to the Z axis data level values, the sequence of the values becomes "FFH", "FEH", "FEH", and "FDH". The addresses corresponding to this sequence of the Z axis data level values are "2H", "0H", "3H", and "1H" or "2H", "3H", "0H", and "1H". The latter sequence is the same as the sequence indicated by the data in the memory 12 of FIG. 12C.

Therefore, by means of reading data in the sequence of addresses from the address "0H" to the address "5FFH" in the memory 12, data stored in the data memory 3 can be obtained in the sequence of Z axis data values from the largest to the smallest thereof, while by means of reading data in the sequence of addresses from the address "5FFH" to "0H" in the memory 12, data stored in the data memory 3 can be obtained in the sequence of Z axis data values from the smallest to the largest thereof.

Figure 13:
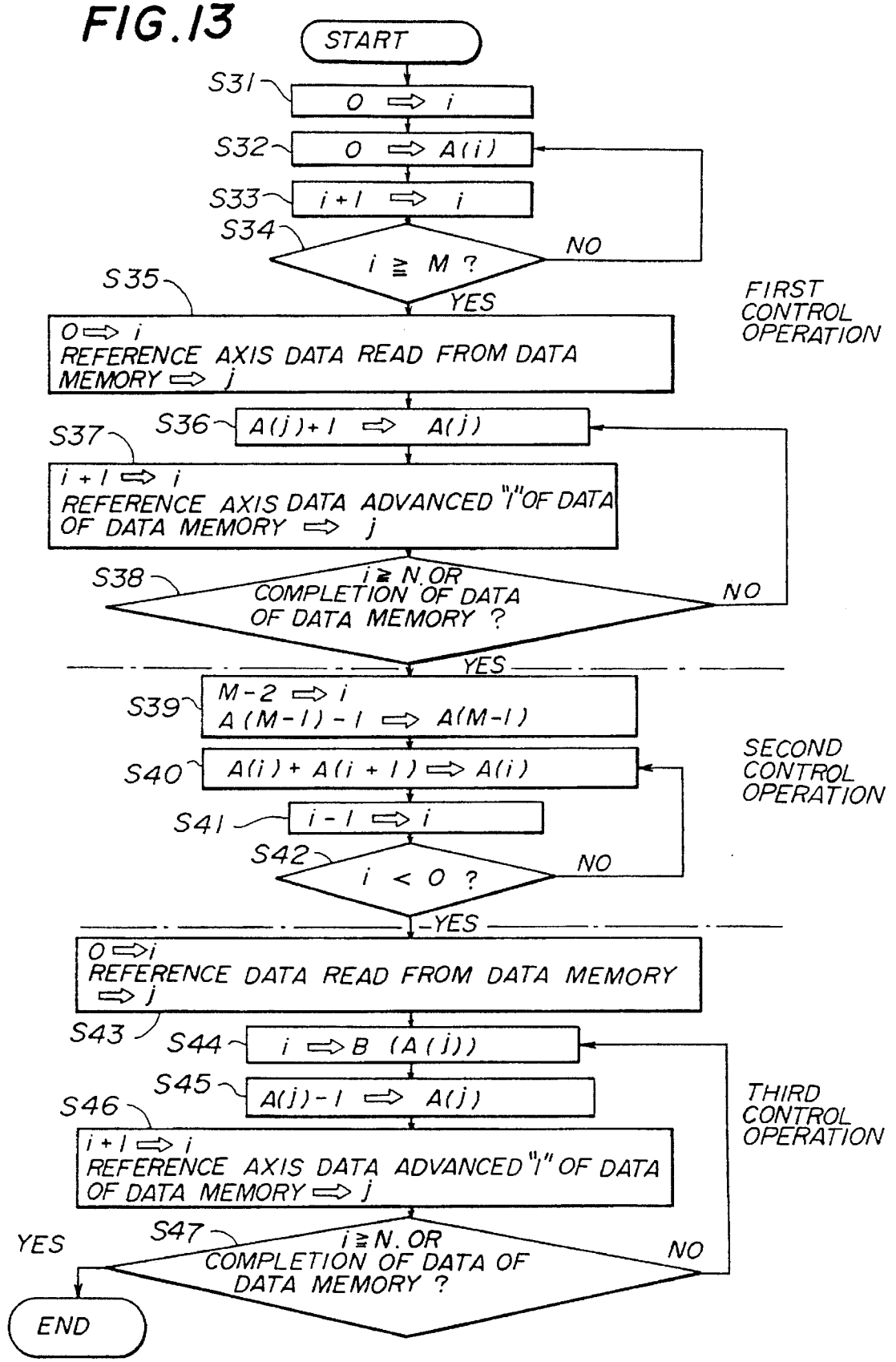
FIG. 13 is a flowchart of a embodiment according to the second invention.

FIG. 13 is a flowchart showing an operation in an embodiment according to the second present invention.

The meanings of the symbols in FIG. 13 are indicated below:

| | |
|---|---|
| M: | possible levels indicated by basic axis data. |
| 0, 1, 2, . . . , M-1: | addresses of the first sorting memory. |
| A(0), A(1), . . . , A(M-1): | data stored in the first sorting memory. |
| 0, 1, 2, . . . , N-1: | addresses of the second sorting memory. |
| B(0), B(1), . . . , B(N-1): | data stored in the second sorting memory. |

The operation of this embodiment will now be described.

First, in a step (the word "step" will be omitted hereinafter) S31 of the first control operation, an address i is set at "0". Then, in S32, data "0" is written in A(i) of the first sorting memory. Next, in S33, the address i is incremented by one. S32 and S33 are then repeated until the address i reaches at M, A(i) being initialized in the address i from "0" to "M−1".

Subsequently, in S35, the address i is set at "0", and then data is read from the data memory. Then a reference data of the data read from the data memory is referred to as j. Next, in S36, A(j) is incremented by "1", then the result of this incrementation is rewritten as A(j). Next, in S37, i is incremented by "1", and then the next data is read from the data memory. Then the reference data of the data read from the data memory is referred to as j. The S36 and S37 are repeated until i reaches "N" or the reading of data from the data memory is completed in S38.

In S39 of the second control operation, i being set at "M−2", "1" is subtracted from A(M−1). Then the result of this subtraction is rewritten as A(M−1). In S40, A(i) and A(i+1) are added together, and then the result of this addition is written as A(i). In S41, i is decremented by "1". Further, S40 and S41 are repeated until j becomes less than "0".

Further, in S43 of the third control operation, i is initialized. Then data is read from the data memory, a reference data of the data read from the data memory being referred as j. In S44, i is written as B(A(j)) of the second sorting memory. In S45, A(j) is decremented by "1", then the result of this subtraction is rewritten as A(j). In S46, i is incremented by "1", the next data is read from the data memory, then a reference data of the data read from the data memory is referred to as j. Further, steps from S44 to S46 are repeated until i reaches "N" or the reading of data from the data memory is completed in S47.

In the second present invention, if each of the reading and writing actions performed on the first or second sorting memory 11, 12 is defined as being one cycle, and if possible levels indicated by reference axis data (in this case, the Z axis data levels of 256 levels) are M levels and a number of data to be sorted (in this case, 1536 items) is N items, then M cycles are needed for the initialization of the memory 11, N cycles are needed for the second control operation, and 3N cycles are needed for the third control operation. Thus, 8N+M cycles in total are needed for completing the predetermined sorting operation. That is, the number of cycles needed for completing the sorting operation is indicated by the linear expression 8N+M. Thus, if the number N or M is increased, the number of cycles needed for completing the sorting operation is increased linearly. Further, especially, in the linear expression, the number M is not multiplied, while the number N is multiplied by 8, then even if a possible number of the reference data levels, that is M, is increased, such an increase will hardly influence the total amount of time needed for performing the sorting operation.

Further, the second invention will be realized even if the memories 11, 12 having enough capacity for (a possible number of Z axis levels where the object data exist)+(a number of data to be sorted) words and that capacity is sufficient enough to allow the maximum number of bits, this number corresponding to these words being indicated by a binary number system.

In the above embodiment, the sorting memory 10 comprises two memories, the first memory 11 and the second memory 12. However, it is possible for the sorting memory 10 to be formed so as to have two memory areas, these areas serving as the two memories 11 and 12, respectively.

Further, the present invention is not limited to these preferred embodiments, and various variations and modifications may be made without departing from the scope of the present invention.

What is claimed is

1. A sorting apparatus comprising:

a data memory for storing a plurality of data, each of said data having reference data indicating a predetermined reference level;

a sorting memory for writing therein data based on said plurality of data;

control means for sorting said plurality of data in sequence of said predetermined reference levels of said plurality of data;

said control means writing data to said sorting memory so that addresses of said plurality of data are obtained in the sequence of said predetermined reference levels of said plurality of data by tracing data written in said sorting memory by repeatedly reading data in said sorting memory by means in which each data has information about a respective address of a next data to be read, said sorting memory comprising:

a first sorting memory wherein addresses are respectively set corresponding to respective ones of said predetermined reference levels, and a second sorting memory wherein addresses are respectively set corresponding to respective ones of said plurality of data; and said control means comprising:

first control means for writing address data of said first sorting memory in respective storage areas of said first sorting memory so that each address data written in a respective storage area corresponds to one of said predetermined reference levels, and each said respective storage area is itself addressed as an address corresponding to another predetermined reference level one level behind of said one predetermined reference level, and second control means for reading data stored in said data memory in sequence after completion of an operation of said first control means, for reading data stored in a storage area of said first sorting memory each time said data is read from said data memory, said storage area being addressed as an address corresponding to one of said predetermined reference levels, said one predetermined reference level being one level advanced of another predetermined reference level, and said another predetermined reference level being indicated by a reference data included in said data read from said data memory, for writing said data read from said first sorting memory to each storage area of said second sorting memory to each storage area of said second storage memory in sequence each time said data is read from said first sorting memory, and for writing an address number of said storage area of said second sorting memory to said storage area of said first sorting memory.

2. The sorting apparatus according to claim 1, further comprising:

a register for keeping data written in a storage area of said first sorting memory; and third control means for reading data stored in said first sorting memory in sequence after completion of an operation of said second control means, for making said register keep said data read from said first sorting memory if said read data corresponds to an address of said second sorting memory, or for replacing said read data by said data kept in said register if said read data corresponds to an address of said first sorting memory.

3. The sorting apparatus according to claim 1, wherein each of said addresses for addressing written data of said first and second sorting memories has at least one address recognizing bit for recognizing whether each of said plurality of data belongs to said first sorting memory or said second sorting memory.

4. A sorting apparatus comprising:

a data memory for storing therein a plurality of data, each of said data having reference data indicating a predetermined reference level;

a sorting memory for writing data therein based on said plurality of data; and control means for sorting said plurality of data in sequence of the predetermined reference levels of said plurality of data;

said control means writing addresses of said plurality of data to said sorting memory corresponding to sequence of said plurality of data if said plurality of data are ordered in accordance with sequence of the predetermined reference levels of said plurality of data, said sorting memory comprising:

a first sorting memory wherein addresses are respectively set corresponding to respective the predetermined reference levels, and a second sorting memory for writing therein addresses of said plurality of data corresponding to sequence of the predetermined reference levels of said plurality of data;

said control means comprising:

first control means for initializing as "0" all data of said first sorting memory, for reading said plurality of data in sequence, and for incrementing by one data written in a storage area of said first sorting memory addressed as an address corresponding to a reference level of said read data each time one of said plurality of data is read, second control means for reading data written in said first sorting memory in sequence after completion of an operation of said first control means, and for rewriting a result of decrementing by one, first read data from said first sorting memory in a storage area in which data is read in said first sorting memory, and for rewriting a result of adding together one read data and another data read after said one read data in a storage area from which said another data is read in said first sorting memory, and third control means for reading said plurality of data in sequence after completion of an operation of said second control means, for reading data in said first sorting memory addressed as each of reference levels, said predetermined reference levels are indicated by said plurality of data, each time one of said plurality of data is read, for writing an address, from which address each of said plurality of data is read, in a storage area of said second sorting memory addressed as said data read from said first sorting memory, and for rewriting a result of decrementing by one said data read from said first sorting memory in the storage area of said first sorting memory, from which storage area said data is read.

5. A sorting method comprising the steps of:

(a-1) initializing as "0" all data of a first sorting memory, (a-2) reading a plurality of data stored in data memory in sequence, and (a-3) incrementing by one, data written in a storage area of said first sorting memory addressed as an address corresponding to a reference level of said read data each time one of said plurality of data is read, (b-1) reading data written in said first sorting memory in sequence after completion of an operation of said steps (a-1), (a-2) and (a-3), (b-2) rewriting a result of decrementing by one, first read data from said first sorting memory in a storage area in which data is read in said first sorting memory, (b-3) rewriting a result of adding together one read data and another data read after said one read data in a storage area from which said another data is read in said first sorting memory, (c-1) reading said plurality of data in sequence after completion of an operation of said steps (b-1), (b-2) and (b-3), (c-2) reading data in said first sorting memory addressed as each of reference levels, said levels are indicated by said plurality of data, each time one of said plurality of data is read, (c-3) writing an address, from which address each of said plurality of data is read, in a storage area of second sorting memory addressed as said data read from said first sorting memory, and (c-4) rewriting a result of decrementing by one said data read from said first sorting memory in the storage area of said first sorting memory, from which storage area said data is read.

* * * * *